United States Patent [19]

Fischer

[11] Patent Number: 4,722,454
[45] Date of Patent: Feb. 2, 1988

[54] FILLER INLET FOR A FUEL TANK, PARTICULARLY FOR MOTOR VEHICLES

[75] Inventor: Roland Fischer, Mallersdorf, Fed. Rep. of Germany

[73] Assignee: Dr. Ing. h.c.F Porsche Aktiengesellschaft, Weissach, Fed. Rep. of Germany

[21] Appl. No.: 931,080

[22] Filed: Nov. 17, 1986

[30] Foreign Application Priority Data

Nov. 16, 1985 [DE] Fed. Rep. of Germany ....... 3540740

[51] Int. Cl.⁴ .................... B65D 25/00; B65B 3/04
[52] U.S. Cl. ..................... 220/85 R; 220/85 VS; 137/587; 141/285; 280/5 A
[58] Field of Search ............. 220/85 S, 86 R, 86 AT, 220/85 VS, 85 VR, 366, 367, 85 R, 368; 141/37–66, 285–310, 346–362; 137/587; 280/5 A

[56] References Cited

U.S. PATENT DOCUMENTS

| | | | |
|---|---|---|---|
| 3,187,936 | 6/1965 | Downing | 220/86 |
| 3,800,978 | 4/1974 | Sigwald | 220/85 R |
| 4,441,533 | 4/1984 | Snyder et al. | 220/86 R |
| 4,450,881 | 7/1983 | Buttner | 141/285 |

FOREIGN PATENT DOCUMENTS

| 1175097 | 7/1964 | Fed. Rep. of Germany . |
|---|---|---|
| 2952175 | 7/1981 | Fed. Rep. of Germany . |

*Primary Examiner*—Houston S. Bell, Jr.
*Attorney, Agent, or Firm*—Barnes & Thornburg

[57] ABSTRACT

A fuel filler neck with a vent device is provided for receiving fuel from a dispensing pistol and depositing the fuel into a fuel tank, which fuel filler neck simultaneously allows for optimal utilization of the fuel tank volume and for operationally adequate venting during refueling. The filler neck is formed in one piece with the vent device having a cross-sectional enlargement forming an expansion space. A connecting duct is provided at the area where the expansion space opens into the filler neck and a discharge gap is provided at the area where the vent device enters the filler neck.

14 Claims, 3 Drawing Figures

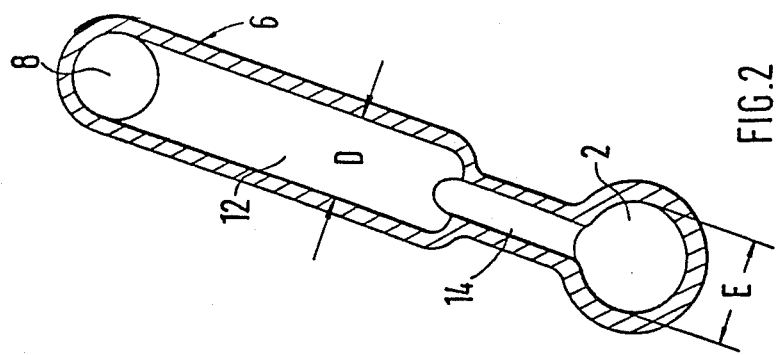
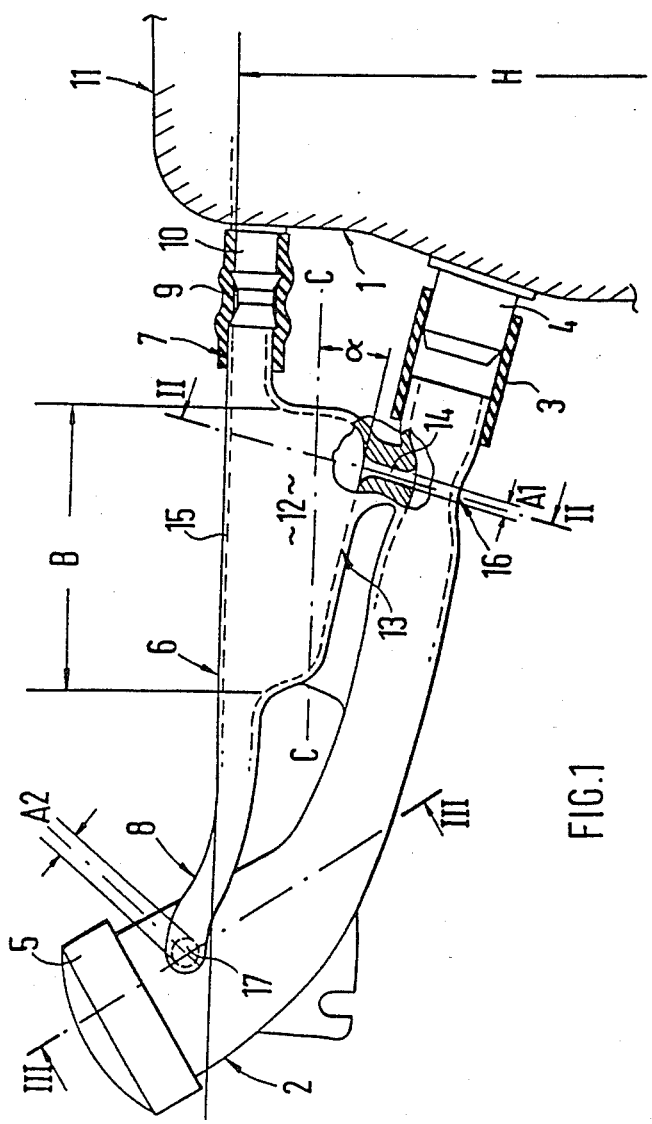
FIG.2
FIG.1

FILLER INLET FOR A FUEL TANK, PARTICULARLY FOR MOTOR VEHICLES

BACKGROUND AND SUMMARY OF THE INVENTION

The invention relates to a filler neck for a fuel tank having a vent device, particularly for motor vehicles, for receiving fuel from a dispensing pistol and for depositing the fuel into a fuel tank.

Such a fuel filler neck and vent device has been contemplated in German Unexamined Published Patent application (DE-OS) No. 29 52 175 corresponding to U.S. Pat. No. 4,450,880 issued May 29, 1984. This device serves, with a vent device of a constant hollow cross-section, to allow the escape of air displaced from the fuel tank through the vent device into the filler neck and into the outside environment. The vent device extends approximately in parallel to and at a small distance from the filler neck located below the vent device. The filler neck has a larger inside diameter than the outside diameter of the dispensing pistol at an area below the dispensing pistol support. The insertion of the dispensing pistol into the filler neck provides for only a relatively small discharge gap for the escaping air at an area below the dispensing pistol support and at the area of an adjacently arranged fitting piece. During the refueling process, the air located in the tank and displaced by the fuel volume flows through the vent device and possibly through the filler neck in the direction of the dispensing pistol support resulting in the disadvantage that a back pressure is created at the area where the vent device enters the filler neck and producing the undesirable effect of a turning off of the dispensing pistol and the undesirable effect of fuel spilling from the filler neck into the outside environment. Furthermore, because the location of the connection of the end of the vent device to the side of the fuel tank determines the maximum filling level of the fuel tank, this arrangement provides that a relatively large tank volume located above the maximum filling level remains unutilized.

An objective of the invention is to provide a filler neck of the above mentioned type with constructively simple means with the fuel tank volume being optimally utilized and also so that an operationally adequate venting occurs during uninterrupted refueling.

This objective is achieved according to preferred embodiments of the invention by providing a filler neck apparatus which includes a filler neck means having a discharge gap means for the venting of discharged air out of the filler neck means, a means for connecting the filler neck means to the fuel tank, a vent device means having a cross-sectional enlargement forming an expansion space, a means for connecting the vent device means to the fuel tank, and a connecting duct means linking the vent device means to the filler neck means.

When the expansion space is arranged at the vent device and opens through a connecting duct into the filler neck, below which connecting duct the filler neck has a Venturi-type contraction, there is permitted a perfect venting during refueling with no undesirable turning off of the dispensing pistol prior to completion of the refueling process and with no discharge of fuel out of the filler neck into the outside environment. Because the expansion space extends along the vertical axis of the vent device and opens into the filler neck through the connecting duct, the air displaced by the fuel volume in the fuel tank upon refueling proceeds unimpaired through the vent device into the filler neck and is discharged into the outside environment while any fuel particles taken along with the air displaced from the fuel tank experience a reduction in speed in the area of the expansion space resulting in a precipitation of the fuel particles downward into the bottom section of the expansion space and the fuel particles are returned to the fuel tank through the connecting duct and through the filler neck, being supported in this return by the suction effect caused by the Venturi-type contraction formed in the filler neck.

In an especially preferred embodiment of the invention the filler neck, the vent device, and the expansion area are formed in a one-piece development by a blowing process.

Further objects, features, and advantages of the present invention will become more apparent from the following description when taken with the accompanying drawings which show, for purposes of illustration only, an embodiment/several embodiments in accordance with the present invention.

BRIEF DESCRIPTION OF THE DRAWINGS

FIG. 1 is a schematic view which shows a filler neck apparatus constructed in accordance with the preferred embodiment of the invention.

FIG. 2 is an enlarged schematic of part-sectional view which shows the connecting duct between the expansion space and the filler neck used in the apparatus of FIG. 1.

DETAILED DESCRIPTION OF THE DRAWINGS

Figure 3:
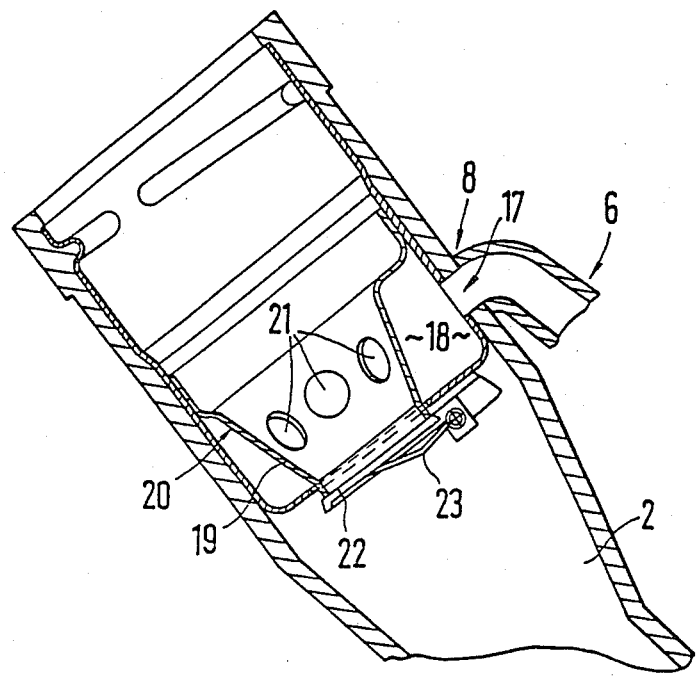
FIG. 3 is an enlarged schematic of part-sectional view which shows the area of the discharge gap for the venting of the air from the vent device into the filler neck used in the apparatus of FIG. 1.

A filler neck 2 is connected to the upper area of a fuel tank 1 at the connecting tube 4 of the fuel tank by means of an elastic collar 3. A detachable cap 5 is fastened to the filler neck 2 at the end opposite to where the filler neck 2 is connected to the fuel tank 1. A vent device 6 is arranged in a substantially horizontal manner above the filler neck 2 formed into the filler neck 2 at one end and connected to a connecting tube 10 of the fuel tank 1 at the other end 7 by means of an elastic collar 9. The vent device 6 is formed at both its end-sections 7, 8 in a constant hollow cross-section.

In a partial area B of its longitudinal course, the vent device 6 has an expanded hollow cross-section extending from the top of the vent device 6 downwardly to the filler neck 2 located below forming an expansion space 12 for the receipt of air and fuel particles taken along with the air displaced from the fuel tank 1. The expanded cross-section is provided particularly along the horizontal axis of the vent device 6. The arrangement provides for an accumulation on the bottom section 13 of expansion space 12 of the fuel particles taken along with the displaced air and through a connecting duct 14 arranged at the lowest point of expansion space 12 are deposited into the filler neck 2 and returned into the fuel tank 1.

The upper edge 15 of the expansion space 12 extends approximately horizontally and as an extension of the two end-side sections 7, 8 of the vent device 6. The bottom 13 of the expansion space 12 is sloped at an acute angle (α) with respect to the horizontal axis of the vent device 6.

The FIG. 2 enlarged illustration of the connecting duct 14 at the area between the expansion space 12 of the vent device 6 and the filler neck 2 shows the width D of expansion space 12 is slightly smaller than the inside diameter E of the filler neck 2. The connecting duct 14 extends approximately upright with respect to an adjacent section of the filler neck 2 located directly below the connecting duct 14. The connecting duct 14 has a hollow cross-section A1 that is smaller in cross-section than the cross-section A2 of the vent device 6 in the area of the entrance of the vent device 6 into the filler neck 2. The end area 8 of the vent device 6 facing the filler neck 2 is located at a level vertically above the level of the end-side section 7 and at a level vertically above the connecting tube 10 of the fuel tank. By means of a Venturi-type contraction 16 provided at the filler neck 2 in the area below the connecting duct 14 a suction effect is produced which aids the return of the fuel particles collected in the bottom section 13 of the expansion space 12 to the fuel tank 1.

The filler neck 2 at the area below the expansion space 12 has a cross-section approximately the size of the cross-section of the mouth area of a dispensing pistol creating a sealing effect at the area where the mouth of the dispensing pistol seats against the filler neck 2 and providing the effect that the fuel dispensed from the dispensing pistol can flow only in the one-way direction into the fuel tank 1.

The FIG. 3 enlarged illustration of the discharge gap shows that the air displaced from the fuel tank 1 escapes only through the vent device 6. After this displaced air escapes past expansion space 12 the air flows through an opening 17 into ring space 18 arranged inside the filler neck 2. Several perforations are provided at an interior wall 19 of the insert 20 forming the ring space 18 through which the displaced air can flow only in the direction of the filler neck cap 5. The ring space insert 20 is developed conically in the area of the perforations 21. Below the ring space 18 a movable flap 22 is arranged to pivot downwardly against the effect of a spring upon insertion of a dispensing pistol into the filler neck 2 as it is guided through the ring space 18.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A fuel filler neck arrangement having a vent device for receiving fuel from a dispensing pistol and depositing the fuel into a fuel tank, said fuel filler neck arrangement comprising:
    filler neck means having a discharge gap means for the venting of discharged air out of the filler neck means,
    filler neck connecting means for connecting the filler neck means to the fuel tank,
    filler neck venturi means located in the filler neck means between the discharge gap and the filler neck connecting means,
    vent device means having a cross-sectional enlargement forming an expansion space,
    vent device connecting means for connecting the vent device means to the fuel tank, and
    connecting duct means linking the vent device means at the cross-sectional enlargement expansion space to the filler neck means venturi means.

2. An arrangement according to claim 1, wherein the vent device means is aligned substantially along a horizontal axis above the filler neck means.

3. An arrangement according to claim 2, wherein the vent device connecting means is arranged at a level vertically above the level where the filler neck connecting means is connected to the fuel tank.

4. An arrangement according to claim 3, wherein the cross-sectional enlargement is formed in the area of approximately the middle third of the vent device means and extends along the vertical axis of the vent device means and extends from the top of the vent device means downwardly to the filler neck means.

5. An arrangement according to claim 4, wherein the bottom section of the expansion space is sloped at an acute angle with respect to the horizontal axis of the vent device means.

6. An arrangement according to claim 5, wherein the width of the expansion space is slightly smaller than the inside diameter of the filler neck means.

7. An arrangement according to claim 6, wherein the connecting duct means is formed at the lowest point of the expansion space and extends approximately upright with respect to the adjacent section of the filler neck means and opens into the filler venturi neck means for allowing return of fuel particles into the fuel tank.

8. An arrangement according to claim 7, wherein the cross-section of the connecting duct means is smaller than the cross-section of the vent device means and smaller than the cross-section of the filler neck means at the venturi means where the connecting duct means enters the filler neck means.

9. An arrangement according to claim 8, wherein a Venturi means is formed in the filler neck means at an area below the the connecting duct means.

10. An arrangement according to claim 9, wherein the filler neck means has a cross-section approximately the size of the outside diameter of the mouth area of the dispensing pistol at the area below the expansion space.

11. An arrangement according to claim 10, wherein the discharge gap means is arranged at the area where the vent device means enters the filler neck means.

12. An arrangement according to claim 11, where the discharge gap means is formed with a perforated ring space means conically arranged inside the filler neck means.

13. An arrangement according to claim 12, wherein a flap means is arranged inside the filler neck means moveably biased against the bottom of the ring space means.

14. An arrangement according to claim 1, wherein the expansion space is constructed in one piece with the vent device means and the filler neck means.

* * * * *